United States Patent
Kasten et al.

(10) Patent No.: US 12,309,232 B2
(45) Date of Patent: May 20, 2025

(54) METHOD AND SYSTEM FOR REDUCING CONNECTIONS TO A DATABASE

(71) Applicant: eBay Inc., San Jose, CA (US)

(72) Inventors: Christopher J. Kasten, Rancho Cordova, CA (US); Igor Chernyshev, San Jose, CA (US); Greg Seitz, Lake Oswego, OR (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/303,819

(22) Filed: Apr. 20, 2023

(65) Prior Publication Data
US 2023/0262131 A1    Aug. 17, 2023

Related U.S. Application Data

(63) Continuation of application No. 17/557,685, filed on Dec. 21, 2021, now Pat. No. 11,647,081, which is a
(Continued)

(51) Int. Cl.
*G06F 13/00* (2006.01)
*H04L 67/1008* (2022.01)
*H04L 67/1021* (2022.01)
*H04L 67/14* (2022.01)
*H04L 67/56* (2022.01)
*H04L 67/564* (2022.01)
(Continued)

(52) U.S. Cl.
CPC .......... *H04L 67/14* (2013.01); *H04L 67/1008* (2013.01); *H04L 67/1021* (2013.01); *H04L 67/56* (2022.05); *H04L 67/564* (2022.05); *H04L 69/14* (2013.01); *H04L 67/1001* (2022.05)

(58) Field of Classification Search
CPC . H04L 67/14; H04L 67/1008; H04L 67/1021; H04L 67/56; H04L 67/564; H04L 69/14; H04L 67/1001
USPC .................. 709/227, 228, 220–222, 239, 203
See application file for complete search history.

(56) References Cited

U.S. PATENT DOCUMENTS 6,563,793 B1 * 5/2003 Golden ............... H04L 47/6215
370/428
6,950,822 B1   9/2005 Idicula et al.
(Continued)

OTHER PUBLICATIONS

U.S. Appl. No. 11/605,066 now U.S. Pat No. 8,943,181 filed Nov. 28, 2006, Method and System for Reducing Connections to A Database.
(Continued)

*Primary Examiner* — Kenneth R Coulter
(74) *Attorney, Agent, or Firm* — SCHWEGMAN LUNDBERG & WOESSNER, P.A.

(57) ABSTRACT

A system automatically maintains a plurality of client connections associated with a plurality of clients, the plurality of client connections including active and idle connections. A first server receives a request from a client of the plurality of clients to access a second server of a plurality of second servers communicatively coupled to the first server, the plurality of second servers having varying communication protocols. The first server then identifies a first communication protocol associated with the second server and activating a link between the first server and the second server using the first communication protocol.

18 Claims, 5 Drawing Sheets

Related U.S. Application Data continuation of application No. 16/380,153, filed on Apr. 10, 2019, now Pat. No. 11,233,857, which is a continuation of application No. 14/604,435, filed on Jan. 23, 2015, now Pat. No. 10,291,716, which is a continuation of application No. 11/605,066, filed on Nov. 28, 2006, now Pat. No. 8,943,181.

(60) Provisional application No. 60/740,331, filed on Nov. 29, 2005.

(51) Int. Cl.
*H04L 69/14* (2022.01)
*H04L 67/1001* (2022.01)

(56) References Cited

U.S. PATENT DOCUMENTS

| | | | |
|---|---|---|---|
| 6,950,848 | B1 | 9/2005 | Yousefi'zadeh |
| 7,024,406 | B1 | 4/2006 | Kunisetty et al. |
| 7,143,131 | B1 | 11/2006 | Soles et al. |
| 7,185,063 | B1 | 2/2007 | Kasriel et al. |
| 7,406,523 | B1 | 7/2008 | Kruy et al. |
| 7,509,671 | B1 | 3/2009 | Bedell et al. |
| 7,761,502 | B2 * | 7/2010 | Srivastava ............ G06F 9/5055 709/250 |
| 8,018,929 | B2 | 9/2011 | Soles et al. |
| 8,214,502 | B2 * | 7/2012 | Muto .................... G10H 1/0058 709/227 |
| 8,244,865 | B2 | 8/2012 | Burke et al. |
| 8,719,242 | B2 | 5/2014 | Theobald et al. |
| 8,943,181 | B2 * | 1/2015 | Kasten .................. H04L 67/564 709/219 |
| 10,291,716 | B2 * | 5/2019 | Kasten .................... H04L 67/56 |
| 10,915,370 | B2 | 2/2021 | Ruan et al. |
| 11,233,857 | B2 * | 1/2022 | Kasten ................ H04L 67/1021 |
| 11,647,081 | B2 * | 5/2023 | Kasten .................. H04L 67/564 709/227 |
| 2002/0078208 | A1 | 6/2002 | Crump et al. |
| 2002/0087729 | A1 | 7/2002 | Edgar |
| 2002/0116457 | A1 | 8/2002 | Eshleman et al. |
| 2003/0033517 | A1 | 2/2003 | Rutherglen et al. |
| 2003/0055826 | A1 | 3/2003 | Graham |
| 2003/0187850 | A1 | 10/2003 | Reed et al. |
| 2003/0225889 | A1 | 12/2003 | Moutafov |
| 2004/0088413 | A1 | 5/2004 | Bhogi et al. |
| 2004/0136379 | A1 | 7/2004 | Liao et al. |
| 2005/0015356 | A1 | 1/2005 | Ireland et al. |
| 2005/0028164 | A1 | 2/2005 | Neuwald et al. |
| 2005/0038915 | A1 | 2/2005 | Clarke et al. |
| 2005/0050039 | A1 | 3/2005 | Theobald |
| 2005/0160084 | A1 * | 7/2005 | Barrett .................... G06Q 10/06 |
| 2005/0172029 | A1 | 8/2005 | Burke et al. |
| 2005/0216784 | A1 | 9/2005 | Srinivasan et al. |
| 2005/0220038 | A1 * | 10/2005 | Muto .................... G10H 1/0058 84/645 |
| 2005/0262183 | A1 | 11/2005 | Colrain et al. |
| 2005/0265317 | A1 * | 12/2005 | Reeves ............... H04L 67/1034 707/E17.107 |
| 2006/0031442 | A1 | 2/2006 | Ashley et al. |
| 2006/0031527 | A1 | 2/2006 | Soles et al. |
| 2006/0031536 | A1 | 2/2006 | Eydelman et al. |
| 2006/0095572 | A1 | 5/2006 | Burke et al. |
| 2006/0146877 | A1 * | 7/2006 | Srivastava ............ G06F 9/5055 370/469 |
| 2006/0146878 | A1 * | 7/2006 | Srivastava .......... H04L 67/1031 370/469 |
| 2007/0038738 | A1 | 2/2007 | Iyengar |
| 2007/0136311 | A1 | 6/2007 | Kasten et al. |
| 2015/0134839 | A1 | 5/2015 | Kasten et al. |
| 2019/0342398 | A1 | 11/2019 | Kasten et al. |
| 2020/0174843 | A1 | 6/2020 | Ruan et al. |
| 2022/0116459 | A1 | 4/2022 | Kasten et al. |

OTHER PUBLICATIONS

U.S. Appl. No. 14/604,435 now U.S. Pat. No. 10,291,716 filed Jan. 23, 2015, Method and System for Reducing Connections to A Database.

U.S. Appl. No. 16/380,153 now U.S. Pat. No. 11,233,857 filed Apr. 10, 2019, Method and System for Reducing Connections to A Database.

U.S. Appl. No. 17/557,685 now U.S. Pat. No. 11,647,081 filed Dec. 21, 2021, Method and System for Reducing Connections to A Database.

"U.S. Appl. No. 11/605,066, Non-Final Office Action mailed Oct. 2, 2009", 33 pgs.

"U.S. Appl. No. 11/605,066, Final Office Action mailed Apr. 16, 2010", 36 pgs.

"U.S. Appl. No. 11/605,066, Non-Final Office Action mailed Sep. 30, 2010", 36 pgs.

"U.S. Appl. No. 11/605,066, Final Office Action mailed Feb. 3, 2011", 52 pgs.

"U.S. Appl. No. 11/605,066, Pre-Appeal Brief Request filed Mar. 8, 2011", 5 pgs.

"U.S. Appl. No. 11/605,066, Appeal Brief Filed May 24, 2011", 31 pgs.

"U.S. Appl. No. 11/605,066, Appeal Decision mailed Jun. 12, 2014", 6 pgs.

"U.S. Appl. No. 11/605,066, Notice of Allowance mailed Sep. 17, 2014", 12 pgs.

"U.S. Appl. No. 11/605,066, Supplemental Notice of Allowability mailed Dec. 10, 2014", 2 pgs.

"U.S. Appl. No. 14/604,435, Preliminary Amendment filed Apr. 14, 2015", 9 pgs.

"U.S. Appl. No. 11/605,066, Decision on Pre-Appeal Brief mailed Apr. 26, 2011", 2 pgs.

"U.S. Appl. No. 11/605,066, Examiner's Answer mailed Aug. 22, 2011", 54 pgs.

"U.S. Appl. No. 14/604,435, First Action Interview - Pre-Interview Communication mailed Jun. 17, 2016", 5 pgs.

"U.S. Appl. No. 14/604,435, First Action Interview—Office Action Summary mailed Mar. 1, 2017", 32 pgs.

"U.S. Appl. No. 14/604,435, Non Final Office Action mailed Aug. 11, 2017", 21 pgs.

"U.S. Appl. No. 14/604,435, Examiner Interview Summary mailed Nov. 16, 2017", 3 pgs.

"U.S. Appl. No. 14/604,435, Final Office Action mailed Jan. 29, 2018", 17 pgs.

"U.S. Appl. No. 14/604,435, Advisory Action mailed Apr. 17, 2018", 2 pgs.

"U.S. Appl. No. 14/604,435, Non Final Office Action mailed Aug. 3, 2018", 8 pgs.

"U.S. Appl. No. 14/604,435, Examiner Interview Summary mailed Sep. 17, 2018", 3 pgs.

"U.S. Appl. No. 14/604,435, Notice of Allowance mailed Jan. 3, 2019", 15 pgs.

"U.S. Appl. No. 16/380,153, Preliminary Amendment Filed Jul. 25, 2019", 6 pgs.

"U.S. Appl. No. 16/380,153, Non Final Office Action mailed Oct. 28, 2020", 15 pgs.

"U.S. Appl. No. 16/380,153, Final Office Action mailed Feb. 9, 2021", 14 pgs.

"U.S. Appl. No. 16/380,153, Non Final Office Action mailed May 19, 2021". 14 pgs.

"U.S. Appl. No. 16/380,153, Notice of Allowance mailed Sep. 17, 2021", 12 pgs.

"U.S. Appl. No. 17/557,685, Non Final Office Action mailed Sep. 29, 2022", 16 pgs.

"U.S. Appl. No. 17/557,685, Notice of Allowance mailed Jan. 5, 2023", 10 pgs.

Oak, Harshad, "Pro Jakarata Commons", Apress Media, LLC, (2004), 1-235.

* cited by examiner

METHOD AND SYSTEM FOR REDUCING CONNECTIONS TO A DATABASE

RELATED APPLICATIONS

This application is a continuation of and claims the benefit of priority under to U.S. patent application Ser. No. 17/557,685 (now U.S. Pat. No. 11,647,081), filed Dec. 21, 2021, which is a continuation of and claims the benefit of priority under to U.S. patent application Ser. No. 16/380,153 (now U.S. Pat. No. 11,233,857), filed Apr. 10, 2019, which is a continuation of and claims the benefit of priority under to U.S. patent application Ser. No. 14/604,435 (now U.S. Pat. No. 10,291,716), filed Jan. 23, 2015, which is a continuation of and claims the benefit of priority under to U.S. patent application Ser. No. 11/605,066 (now U.S. Pat. No. 8,943,181), filed on Nov. 28, 2006, which claims the benefit of priority under to U.S. Provisional Patent Application Ser. No. 60/740,331, filed Nov. 29, 2005, the benefit of priority of each of which is claimed hereby, and each of which are incorporated by reference herein in its entirety.

TECHNICAL FIELD

The present disclosure relates generally to network data retrieval systems, and specifically to reducing connections to a database.

BACKGROUND

As the number of the Web-based services and applications expands, so grows the demands placed upon the network and database equipment supporting such services and applications. Customers or consumers generally interact with a web site through an application server which is connected to a database or databases to perform functions supported by a particular Web-based application and service. To facilitate the scalability and performance of the Web-based application and services on the application server, the application server typically creates and caches concurrent connection(s) to the database(s) for each concurrent user request to the database(s) or anticipated maximum concurrent requests to the database(s). Due to the popularity and demand for Web-based applications and services, the number of application servers and corresponding concurrent connections to the database(s) has been increasing at a rapid rate. This situation may cause scaling issues with the database(s), as significant amounts of memory and processes may be required to support the large number of connections to the database(s). In several cases these connections may consume all of the memory made available for connections and require either taking memory away from the database cache, which may adversely affect performance and scalability, or requiring the addition of RAM (random access memory) to the database severs, which are limited by a maximum RAM capacity. In other cases these large number of connections may exceed a database's maximum design limit of connections and thus may require the use of additional database instances just to handle the connections, when a single database would have otherwise sufficed. Thus causing additional expense for licensing and potentially additional hardware. Additionally, when network or database related issues cause a large amount of connections to become unusable, or a large amount of application servers are restarted, a connection storm of reconnecting to the database can occur, which at large scales can exceed and overwhelm the database's session/connection creation capacity rate and cause significant delays in obtaining a new connection and in some cases indefinite hanging waiting for a session to be created. This significant interruption in reestablishing the flow of data from the database can cause significant interruptions in Web-based applications and services availability and quality of service. As web sites continue to grow and additional application servers are brought on-line, the requirement issue for additional connections continues to deteriorate. One solution for the increasing memory requirements is to continue to add additional RAM and new database server hardware to hold larger amounts of RAM to satisfy the connection requests from the application servers, but this is at a significantly increasing cost per unit of capacity, as server hardware becomes significantly more expensive as you move up into larger and larger RAM capacity class of servers. Another solution for the connection storm issue is to use multiple listener processes on different ports on the database and distribute the connection requests over these listeners. However, in many database servers the connection/session creation capacity rate is so low in comparison to the rate of reconnects during a connection storm that the number of duplicate listeners required is impractical or has diminishing returns.

BRIEF DESCRIPTION OF THE DRAWINGS

Example embodiments are illustrated by way of example, and not by way of limitation, in the figures of the accompanying drawings in which.

DETAILED DESCRIPTION

Figure 1:
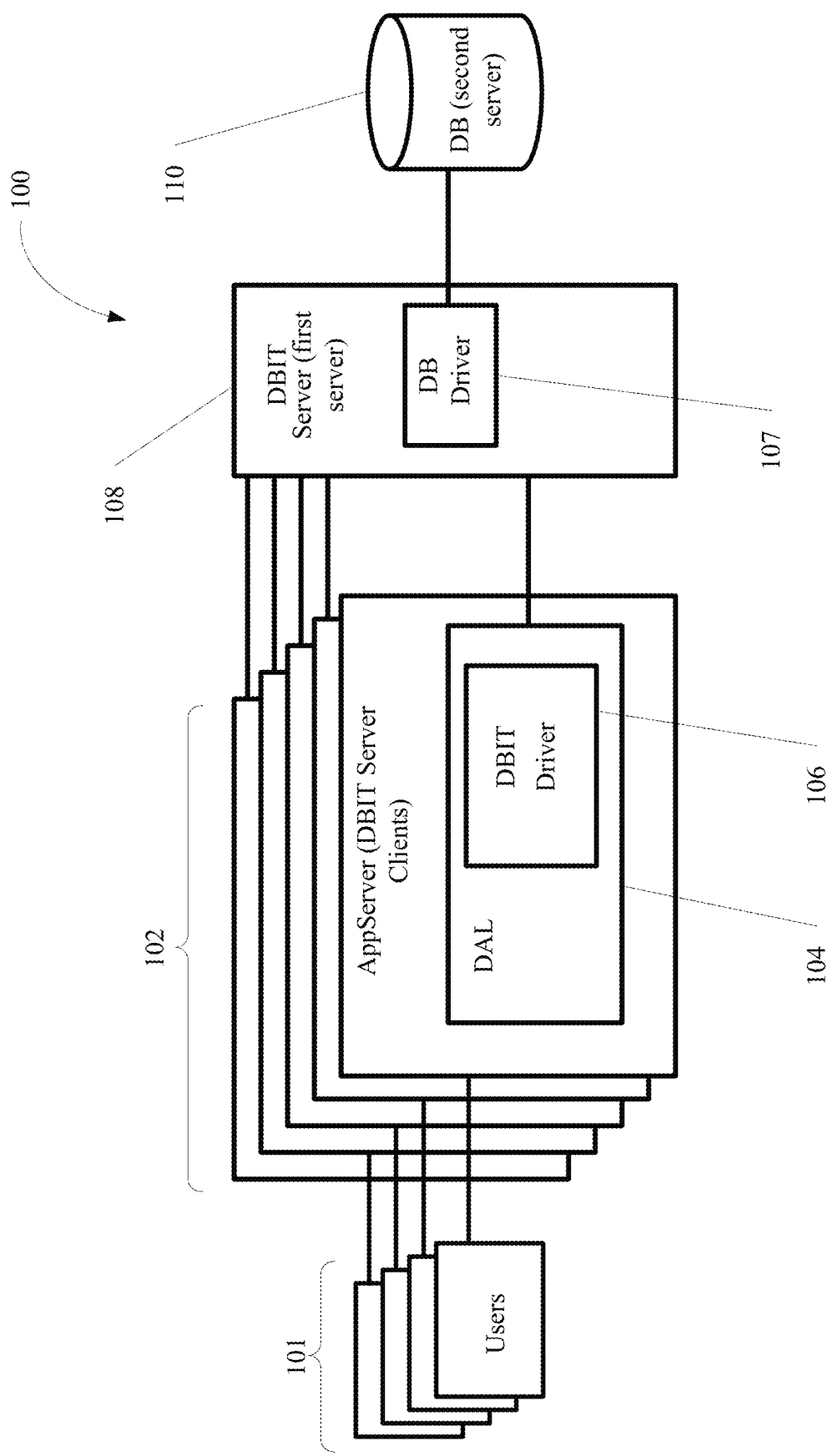
FIG. 1 illustrates an example embodiment of a DBIT (database interaction tier) server system configured to multiplex connections between application servers (DBIT clients) and a database.

In the following description, for purposes of explanation, numerous specific details are set forth in order to provide a thorough understanding of one or more embodiments of the present invention. It will be evident, however, to one skilled in the art that the present invention may be practiced without these specific details.

According to one embodiment, there is provided a system including a first server to maintain a plurality of client connections associated with a plurality of clients. The plurality of client connections may include active and idle connections. The first server may then receive a request from a client of the plurality of clients to access a second server of a plurality of second servers which are communicatively coupled to the first server. In various embodiments, the plurality of second servers may have various communication protocols. The first server may then identify a first communication protocol associated with the second server and activate a link between the first server and the second server using the first communication protocol.

As discussed above, the number of concurrent connections to databases has been increasing at a rapid rate as web sites (e.g., commerce sites) have been horizontally scaled with additional application servers (appservers). This situation has caused scaling issues with the databases, as significant amounts of memory are now required to support the large number of connections to the databases, which only a small percentage may actually be active at one time (e.g., 35 active out of 7,000 connections for a database (<1%), or 330 active client connections out of 16,000 client connections for a more frequently accessed database (<2%)). These connections may consume all of the memory made available for connections and may require either taking memory away from the database cache or the addition of RAM to the database severs. The large numbers of connections may also cause database performance degradation by the large number of processes that may be created for each of the new connections. Design limits of a particular database implementation may also be exceeded by the large number of connections, thus forcing additional database instances to be created just to handle the connections, which may add significant additional system complexity, licensing costs, and hardware costs. Additionally, if a large number of these connections were to become unusable due to network issues, database issues, or application server restart and were to require recreating them, then the database server's session creation capacity rate (e.g., 20 new sessions per second per database listener) may be quickly overwhelmed and may cause significant or indefinite delays in recreating a connection and reestablishing the flow of data from the database to the applications.

In various example embodiments, the systems and methods described herein may be used to decrease the number of connections per database in a scalable, cost conscious, robust and maintainable manner with relatively little impact to the throughput capacity of the appservers and the database servers.

FIG. 1 illustrates an example embodiment of a DBIT (database interaction tier) server system 100 configured to multiplex connections between application servers 102 (DBIT clients) and a database 110. It should be noted that each application server of application servers 102 may be a client of DBIT server 108 and accordingly, the term DBIT client and application server is interchangeable with respect to embodiments described herein.

Each application server 102 may include a database access layer (DAL) 104, having a DBIT driver 106 configured to interface with the DBIT server 108. A multitude of user devices, such as user devices 101, may be connected to one or more of the application servers 102. In one embodiment, the DBIT driver 106 may be a Java JDBC driver, but it will be appreciated by a person skilled in the art that the DBIT driver 106 may be implemented in other known programming languages without departing from the spirit of the methods and systems described herein.

In one embodiment, a computer implemented system of managing server connections includes one or more DBIT clients, such as application servers 102, configured to establish and maintain a plurality of user connections associated with a plurality of user devices 101. The plurality of user devices 101 may be remote from the one or more DBIT clients. The DAL 104 of a DBIT client (application server), which includes the DBIT driver 106, determines if one or more of the plurality of user connections is an active connection. In one embodiment, an active connection includes communication or attempted communication from one or more user devices 101 via the client to a second server, such as database 110. The database 110 may be remote from the user devices 101, the one or more application servers 102 (DBIT clients) and the DBIT server 108. The DBIT server 108 may then establish a unique communication link for each active connection to the database 110 via the DBIT server 108. In this way, the DBIT server 108 multiplexes the connections of the one or more user devices 101 by establishing a communication link to the database 110 for each concurrently active connection of user devices 101.

In one embodiment, the DBIT driver 106 may communicate with the DBIT server 108 via a communications socket (not shown), such as a TCP socket, using a custom DBIT communication protocol. The DBIT server 108 receives requests from the DBIT driver 106 and proxies each request through a database interface, such as a DB (database) driver 107 (e.g., a JDBC (Java database connectivity) interface), to any of the driver connections (e.g., JDCB driver connections) currently not being used for a request to the database 110, which may be cached in a connection pool on the DBIT server 108. Results from the database 110 interaction may then be passed back to the DBIT driver 106 on the application servers 102 for use by the DAL 104 through the DB driver 107. After proxying the results onto the communications socket back to the application servers 102, the connection to the actual database (e.g., the database 110) on the DBIT server 108 is returned to the connection pool for reuse by any other application server's 102 active request. This allows full multiplexing of the active requests from the application servers 102 over any of the connections to the database 110, and reduces the number of actual connections needed to the database 110 to the number of concurrent active requests from all of the application servers 102. The DAL 104 may take advantage of optimizations included in the DBIT driver 106. These optimizations may include forward only scrolling result sets, read only result sets, auto-commit, meta-data caching, statement ID's for reused cached statements, and similar related art optimizations for performance and/or memory footprint reduction.

The communication protocol for the DBIT client/server (e.g., between an application server and DBIT server 108) communication is designed to be non-Java specific, so that the DBIT server 108 may communicate with clients (e.g., application servers 102) implemented in other languages (e.g., Perl, C++, etc.).

Connection pooling for the DBIT driver 106 connections may be provided through a connection pooling process, which in one embodiment may be based on an open software package, such as Apache Commons DBCP, etc. Additionally, the connection pooling may provide control over the flushing of the connection pool, monitoring/statistics for the connection pool, control and monitoring of query statement caches, control over pool actions when exceptions are received from the DBIT server 108, and the ability to add advanced features like dynamic setting of pool configuration parameters during runtime without requiring application restarts and flushing of individual connections in the connection pool. The connection pooling may be implemented in a general pluggable driver manner, so that the connection pooling implementation may be easily replaced with a different connection pooling implementation and is compatible to use in the system for both DBIT server 108 connections as well as direct database 110 connections, which may provide ease of maintenance and consistency in the system.

In various example embodiments, the connection pooling process for the DBIT driver 106 connections may include the:

- ability to accept the DBIT driver 106 without requiring extra functionality implemented on the JDBC interface;
- ability to cache prepared statements (see PreparedStatement object discussed below) both implicitly based on SQL and explicitly with an integer or long key for lookup;
- ability to call a public API to flush individual connections or the entire pool of connections, this may be needed regardless of whether it had a built-in configurable automatic flushing mechanism based on error codes (which would need to be configurable for individual connection or entire pool flushing behavior);
- ability to call a public API to flush individual query statements (e.g., SQL PreparedStatements as in Java's JDBC model) from the query statement cache associated with a connection; this feature may be used to address PreparedStatement cursor corruption (e.g., in Oracle the ORA-01003 error that makes a PreparedStatement unusable);
- public API access to obtain actual driver vendor specific Connection object, (e.g., Oracle PreparedStatement object for the Oracle Java JDBC driver, etc.) so that vendor specific methods can be called without causing issues with the any general interface wrapper object that the pooling implementation may use;
- ability to be dynamically configured during runtime any of the connection pool configuration parameters and have the changes take effect without destroying the connections/pool and recreating it;
- functionality may include ability to both increase and decrease pool configuration parameters, for example max pool size, with the pooling implementation either increasing or shrinking the pool transparently;
- configurable idle timeout, orphan timeout, connection wait timeout, maximum pool size, minimum pool size, pre-populate count, query statement cache size per connection, etc;
- ability to pass configuration properties to drivers like the Oracle properties oracle.jdbc.V8Compatible=true;oracle.jdbc. TcpNoDelay=true;
- programmable configuration interface, so that the configuration data can be drawn from existing standard files, JNDI, or a central repository and used to create connection pool instances directly in code;
- query statement cache includes ability to cache multiple types of query statements (e.g., CallableStatements in Java JDBC);
- ability to easily obtain and/or easily implement custom metrics for reporting to a configurable centralized and local logging and statistics gathering system; for example, current pool size, current prepared statement cache size, prepared statement cache eviction count, thread wait for connection count, thread wait for connection timeout count, running average wait for connection time, connection orphan count, creates, destroys, etc; and
- configurable logging of warnings/errors to a centralized and local logging and statistics gathering system when certain events happen like waiting for connections (even when it doesn't result in a timeout), orphaned connections, etc.

Figure 3:
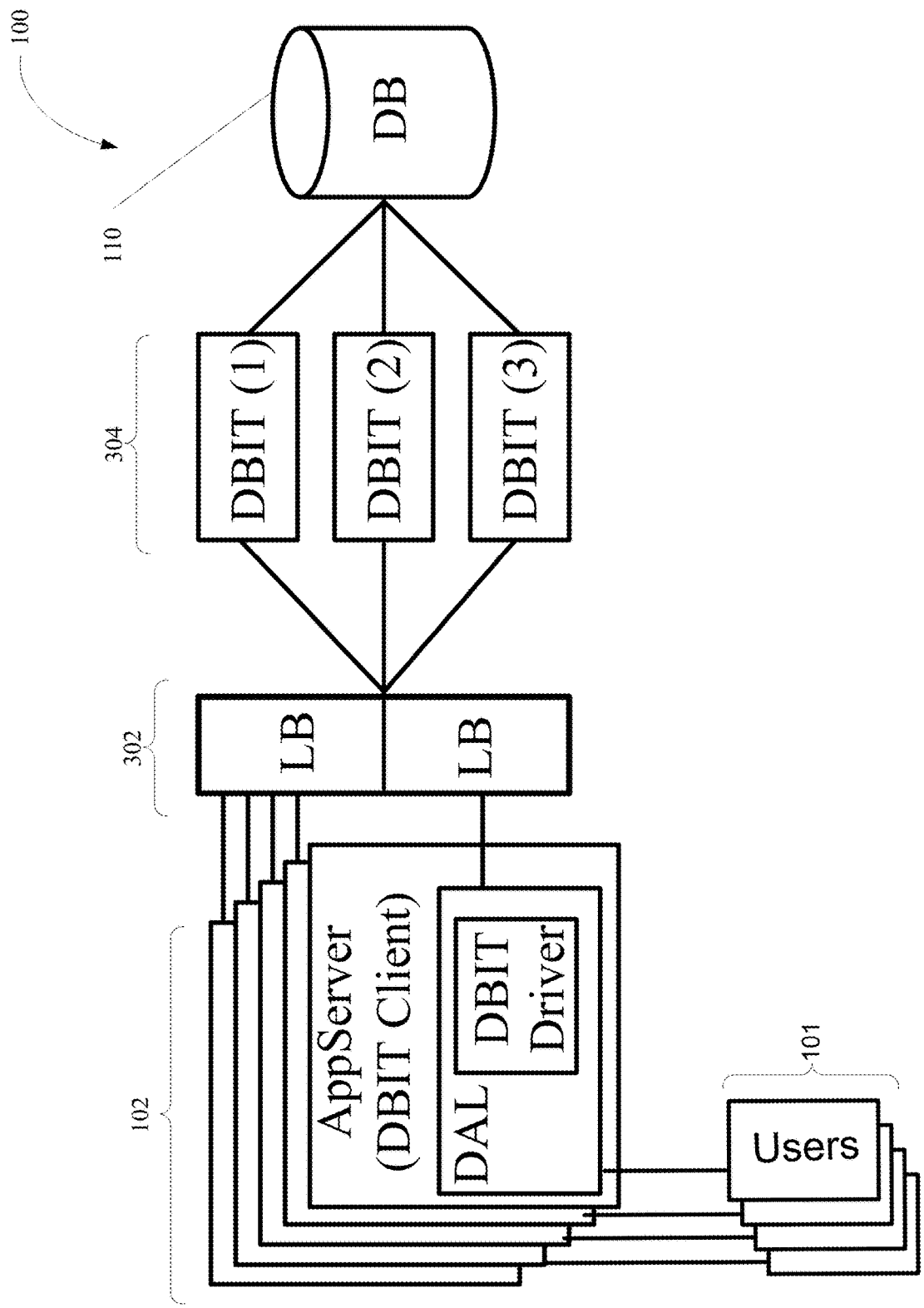
FIG. 3 is a diagram illustrating the DBIT server system configured to include load balancers to distribute load demand from application servers across a DBIT server pool for horizontal scalability of the DBIT tier.

In one example embodiment, for each physical destination database (e.g., a user information database), data sources may be defined or configured on one or more of the application servers 102 for both the actual database 110 using a vendor driver (not shown) and the DBIT server 108 using the DBIT driver 106 or one or more load balancers that may distribute over a group or pool of DBIT servers 108 (e.g., see FIG. 3, load balancers 302 and DBIT server pool 304). Internal logic to the application determines which data source (e.g., DBIT or database 110 directly) to use for a request. This logic may be externally controlled dynamically during runtime.

The DBIT driver 106 may be implemented, in an example embodiment, to internally use one connection to a particular DBIT server (e.g., DBIT server 108) and multiplex multiple requests in the DBIT communication protocol over this one connection, thus eliminating the requirement for a connection per concurrent request from application servers 102 to a particular DBIT server.

In one embodiment, the connection pooling implementation may be configured to implicitly or explicitly recognize multiple connection pools configured to connect to the same DBIT server pool (e.g., see FIG. 3, DBIT server pool 304) and collapse these connections pools internally to one common connection pool, so that connections to the DBIT servers 108 in the DBIT server pool are reduced and resources are conserved at the DBIT server layer as well.

In one embodiment, DBIT PreparedStatement objects may be cached in a client process that is using the DBIT driver 106 (e.g., application servers 102). By caching the DBIT PreparedStatement object, the client (appserver) is able to have the DBIT driver 106 more optimally interact with the DBIT server 108 on subsequent requests following its first usage. For example, the cached DBIT PreparedStatement object may contain information like a unique numeric ID that may be issued to the client after the first usage of the statement, which may be used to identify and lookup the prepared statement in the DBIT server 108 much more efficiently on subsequent requests. Other information, like result set metadata, may also be cached in the DBIT PreparedStatement for minimizing the amount of data serialized and deserialized between the client and the DBIT server 108 on each request.

In one embodiment, a typical client using the DBIT driver 106 (e.g., application servers 102) establishes a connection with a given DBIT server 108 and holds that connection until it times out the resource, or the DBIT server 108 cleanly indicates that it is in an unavailable state (e.g., it is in shutdown mode, or the request exceeded a timeout waiting in a queue to process a request, etc.) via a DBIT exception response. However, sometimes a connection to a DBIT server 108 may have been broken but not yet detected by the client code (e.g., at application server 102). This may happen when a DBIT server 108 process is simply killed at the operating system level and the operating system makes an effort to reset the underlying TCP connections. In this situation, the client may not detect the dropped connection until it attempts to write a subsequent request to the DBIT server 108 on the connection, which may occur minutes (depending on the pool timeout values) after the DBIT server 108 was killed. Worse, if the TCP reset response from the DBIT server 108 was dropped in transit to the client, the client may not detect the failure until it timeouts out from blocking on a socket waiting for a response to read from the server. In all these cases, it is desirable that the client have an opportunity to succeed in performing its database operation, even though it has encountered an issue with its attempt to use a connection to the DBIT server 108. Therefore, to provide an opportunity for success in performing a database operation, the DBIT server system 100 has a configurable retry functionality that will potentially retry database operations based on the type of error that occurred, the type of operation being performed, and the phase it was in performing that operation.

In various embodiments, to support configurable retry functionality, the DBIT server system 100 may internally retry database operations. First the DBIT server system 100 may clean up the socket resources associated with the DBIT connection on the client (e.g., application servers 102) that had the error and attempt to reconnect. The reconnect attempt establishes a new connection to another available DBIT server 108 (e.g., DBIT server 108) in a DBIT server pool. The available DBIT server may be behind a load balancer (e.g., see FIG. 3, load balancers 302 and DBIT server pool 304). Once the new connection is established, the operation may be requested again on the new connection. The number of cleanup/retries upon failure may be configurable.

In order to avoid duplicate database modification operations (e.g., insert, update, and delete operations) on the database 110, one embodiment of the DBIT server system 100 may have a more complex interaction between the client using the DBIT driver 106 and the DBIT server 108. Database modification operations can be broken down into two stages with an expected server acknowledgement between them. In the first stage, the information to prepare for execution is submitted to the DBIT server 108 (e.g., statement ID, parameter values to be bound to the statement, etc.). If a failure occurs on this initial write to the DBIT server 108, or on the subsequent read waiting for acknowledgement from the DBIT server 108 that it has prepared the statement for execution, the client has an indication that the DBIT server 108 has not attempted to execute the statement and the DBIT driver 106 returns a specific type of exception indicating that the connection should be closed and a retry attempt can be performed (e.g., in a read, insert, update or delete operation). This may occur in situations where the DBIT server 108 process is killed, or other issues (e.g., network issues) prevent the client from reaching the DBIT server 108. If however, the initial preparation call to the DBIT server 108 is successfully acknowledged by the DBIT server 108 and received by the client (e.g., the application server 102), thus indicating the end of the first stage, then the DBIT driver 106 may proceed to the execute phase and send the command to the DBIT server 108 to execute the prepared database operation. If there is an immediate exception relating to the connection to the DBIT server 108 during the second stage of executing a command to the DBIT server 108, the DBIT driver 106 may logically determine, based on an immediate client side socket error on the write indicating the data could not have arrived at the DBIT server 108, that the DBIT server 108 has not received the message and that the operation can be retried as above on a new connection and thus it returns a specific exception indicating that the operation can be retried. Otherwise, if an error is encountered, as a response from the DBIT server 108 or when the client is waiting to read a response from the DBIT server 108, the client and DBIT driver 106 do not know the execute state and an exception is returned indicating a retry is not safe. In this case, the client (e.g., the application server 102) cleans up the socket related resources for that connection and communicates an appropriate exception back to the application code to handle the failed operation.

In an alternate embodiment, the retry functionality of a particular operation may be handled transparently within the DBIT driver 106 instead of returning an exception for the code above it in the DAL system to prepare again.

In various embodiments, the DBIT server system 100 may support both auto-commit and client side controlled transactions. Auto-commit settings may flow through the connection to the DBIT server 108 and are set on the actual connection to the database 110. Client side controlled transactions (e.g., commit and rollback controlled in the application server code on the connection interface) may also flow through to the actual connection to the database 110. Database connections involved in a client side controlled transaction are associated with a DBIT session until that transaction is committed or rolled back (either by client command or due to a configured transaction timeout on the DBIT server 108).

In one embodiment, the DBIT server 108 runs in a servlet container (not shown), so that web based configuration and administration can be performed via HTTP. In one embodiments, the actual DBIT driver 106 may talk to the DBIT server 108 via any available TCP socket port, as it can use its own communication protocol that does not require HTTP.

Figure 2:
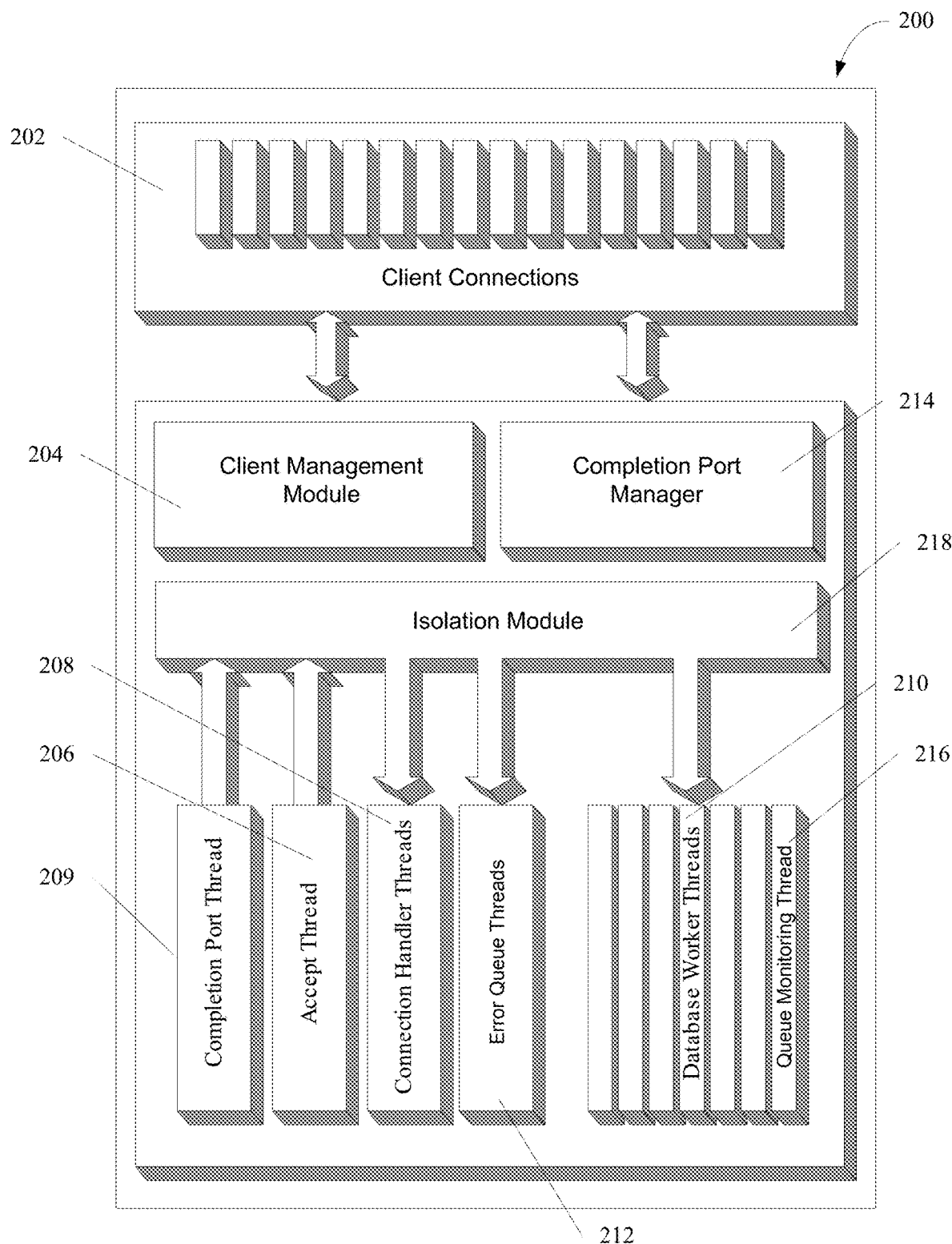
FIG. 2 illustrates an embodiment including engines and modules of the DBIT server configured to manage client connections by multiplexing active client connections over a subset of the database connections.

The implementation of the DBIT server 108, in one example embodiment, may include a core communications dispatcher and a number of worker threads (e.g., see FIG. 2). The DBIT server system 100 may maintain tens of thousands of connections at any given time with several thousand transactions per second performed by a pool of worker threads equal to the concurrency of the requests actively engaging in database activity.

In one embodiment, to maintain a high number of concurrent active connections and a high data rate, the DBIT server 108 may use a single thread per connection approach, which allocates a single worker thread dedicated to each client connection in order to provide timely handling of incoming requests.

In another embodiment, the DBIT server 108 may use a small set of listening threads that block on a network select for a given set of sockets. In this approach, once data arrives, the set of readable sockets is returned and events are dispatched into a small set of worker threads to handle the high level database activity.

In yet another embodiment, the DBIT server 108 may use a small number of dispatch threads using queued completion or event notification. A dispatch thread blocks on an operating system completion queue in conjunction with the use of overlapped I/O on the network sockets. This embodiment allows the operating system of the DBIT server 108 to simply queue notifications to the DBIT server dispatch thread when a socket has received data, so that the DBIT server dispatch thread can then dispatch these sockets to a queue for worker threads to perform the work. The elimination of individual threads to block on every connection waiting for data to be received, or polling over a set of sockets checking for data availability, makes the system scalable to very large numbers of connections. This asynchronous socket read readiness dispatch functionality may be implemented using native calls to the operating system libraries (e.g., IO completion port on the Windows operating system) via JNI (Java Native Interface) in Java. This functionality is encapsulated inside the Completion Port Manager 214.

In one embodiment, the DBIT server 108 of DBIT server system 100 utilizes request queues to pass control from the incoming dispatcher to the appropriate worker threads. By using a request queue approach the DBIT server 108 may efficiently dispatch to one or more worker threads (e.g., see FIG. 2) and control properties such as request timeout and thread allocation on an individual work queue basis.

In one embodiment, after the worker threads begin to operate upon the sockets dispatched to a queue, the sockets may be used in a standard synchronous/blocking I/O read and write manner with a dedicated worker thread until the request is completed. At the end of the request, the worker thread is returned to the thread pool and the socket is returned to the completion port manager 214, where it will be marked for notification events to trigger its dispatch to a worker queue when data arrives again on the socket. To limit the possible amount of time spent blocking on network activity, according to one embodiment, a further enhancement of sockets in Java may be made through JNI native calls to operating system level methods on the underlying socket that may allow setting of the write timeout on a socket. The read timeout support is already provided by Java.

In another embodiment, after the worker threads begin to operate upon the sockets dispatched to a queue, the sockets may be used in an asynchronous/non-blocking I/O read and write manner with the worker threads attempting to multitask multiple requests at once and use non-blocking I/O for all client and the database 110 I/O interactions.

FIG. 2 is a block diagram illustrating example engines and modules of the DBIT server 108 configured to manage client connections 202 by multiplexing active client connections over a subset of the database 110 connections. In one embodiment, an accept thread 206 may be implemented by a client management module 204 to handle incoming new client connection 202 requests. The accept thread 206 blocks on the server socket accept method and waits for new connection requests. Upon arrival of a connection request, the incoming socket event may be dispatched into a specific new connection request queue (not shown) that is configured with a small set of connection handler threads 208 for specifically processing new connection requests. One or more connection handler threads 208 may process the incoming authentication requests and either accept or reject the connection. If a connection is accepted, it may be wrapped in a connection object which is given the socket and is set to generate notification of subsequent data arrival on the socket. In another embodiment connection requests can be received asynchronously using a mechanism of I/O completion notifications.

In one embodiment, a completion port manager 214 may maintain a connection object (not shown) that provides both an input and an output stream around the underlying socket and a set of methods to control readiness state of the socket. In one embodiment, the completion port manager 214 may be implemented using a single thread that blocks on the completion port for all sockets utilizing the extensions provided via JNI and the operating system libraries (e.g., IO completion port on Windows). Whenever a socket completes in the ready to read state, the associated connection object may be found in the completion port manager 214 and it may be dispatched to a work queue based on the ID read from the header of the request or based on any other relevant information associated with the DBIT client connection. After queuing the work, the process may be repeated by a completion port thread 209 reentering a blocking wait against the completion port for notification of the next socket with data available to read on it.

In one embodiment, a queue monitoring thread 216 may be used to monitor the state of requests on the various queues to check for stale requests that have been sitting in the queue too long. Stale requests may be defined as requests that have exceeded their time to live (TTL) for a given queue, where TTL is the maximum amount of time allowed for a request to sit in a queue before the system should give up on trying to get it completed and just return an error to the client in a timely manner, so that the client doesn't abandon the request and the DBIT server can recover from a potential flood of backed up requests. Requests that have exceeded a TTL timeout may be removed from the work queue (not shown) and placed in the error processing queue (not shown) by the queue monitoring thread. This mechanism may protect against the DBIT server 108 becoming overwhelmed by backlogged requests and provides a controlled and timely response to the client (e.g., application server 102), so that it may retry its request as previously described in a timely manner.

In one embodiment, one or more error queue threads 212 may be responsible for handling requests placed in the error queue due to an error condition occurring. For example, when the queue TTL has been exceeded, the error queue threads may send an exception response to the associated client indicating the timeout condition.

In one embodiment, one or more database worker threads 210 may be a pool of worker threads created to handle database requests from the DBIT driver 106 clients (e.g., application servers 102). Different work queues may be created for different isolation areas and may be allocated worker threads dynamically from the global thread pool to perform work from their work queues when work exists. Isolation areas may be defined via a configuration file and are uniquely identified and configured based on at least one or a combination of the following criteria: a client application server pool name (name set by the client), destination database name, and query name. In one embodiment, isolation module 218 manages one or more isolation areas and associated work queues.

Threads from the worker pool obtain and perform requests from the different isolation area work queues. In one embodiment, there may be a maximum number of threads defined for each isolation area work queue and a global maximum number of threads for the entire worker thread pool. The queue thread maximum may control individual queues from monopolizing all of the threads and starving other queues. The global maximum may control the overall maximum workload that can run on the DBIT server 108 to prevent it from becoming overloaded.

In one embodiment, the database worker threads 210 may obtain work from the queues according to a weighting algorithm that ensures fairness in thread allocation by organizing queues into buckets based on a variety of criteria including current total number of active threads on a queue, current percent of maximum active threads on a queue, and similar related weighting values.

In one embodiment, to efficiently route incoming requests to an appropriate queue, a small header may be written on each incoming request containing the queue ID of the queue to route the request to. The DBIT driver 106 may map the query name to the appropriate queue ID through data obtained from the DBIT server 108 in the initial connection negotiation.

Therefore, according to an example embodiment, the DBIT server 108 may allow configuration down to the per host/pool/query level which allows configuration controlled isolation areas of DBIT server 108 activity to ensure that no spiking database activity or failing database (e.g., database 110) can monopolize all of the DBIT server's 108 resource capacity for CPU, memory, threads, and other resources in a given DBIT server 108.

In various embodiments, DBIT servers (e.g., DBIT server 108) may utilize one or more mechanisms to handle large connection storms or surges of new connection requests from the application servers (e.g., which can be the result of network issues or application servers 102 being restarted in large groups) and provide timely responses to the application servers 102, both for the new connection request and processing subsequent database 110 requests. In one embodiment, the DBIT server 108 may utilize a socket accept mechanism of a simple TCP socket server in Java to quickly accept connection requests and dispatch them to a connection work queue, where a dedicated pool of threads quickly authenticates and sets up the connection for communication. These connections are created much faster than the creation of the typical database connection, thus the client receives a connection much faster from the DBIT server 108 than it would have with the database 110. The DBIT server 108 may utilize a queuing mechanism in front of the socket accept mechanism in case the requests begin to backlog, in which case the queue will have a maximum size, which when exceeded results in a denial of subsequent requests. This backlog control will allow the application server 102 the ability to attempt another connection request through a load balancer to another DBIT server (e.g., DBIT server 108) in a pool of DBIT servers (e.g., see FIG. 3, DBIT server pool 304), thus distributing the surge over a pool of DBIT servers to get the most timely response.

Once the surge of new connection requests is handled, there will be a surge of database operation requests. The high performance characteristics of the aforementioned asynchronous socket read readiness dispatch functionality dispatches requests to isolation area work queues, which control the flow of requests to the database 110 and thus control the flow of new connection requests to the database 110 and avoid overwhelming the connection acceptance mechanism on the database (e.g. the Oracle listener). If the surge of database operation requests creates a backlog in a particular DBIT server, such as DBIT server 108, then the aforementioned TTL timeout will reduce backlog and relieve pressure from the DBIT server 108 and database 110. In one embodiment, the TTL timeout will trigger a client (e.g., application servers 102) to retry its operation through a new connection, which will distribute the load across a pool of DBIT servers. Thus the DBIT server 108 may provide a better quality of service and quicker restoration of data flow to the application servers 102 when there is a connection storm from a large number of application servers 102, and reduce service interruption and down time of site functionality.

Typically, connections between the client (e.g., application servers 102) and the DBIT server 108 are kept established as long as possible. However, it is possible that either side of the connection may become unresponsive. In one embodiment, to prevent these situations from lasting indefinitely, a timeout mechanism may be implemented at two levels. On the DBIT server 108, timeouts may be set on thread blocking on reads and writes at the socket level or at a higher data stream level to prevent the worker thread from being tied up too long and starving other requests from getting a worker thread. On the client side, the timeouts may also be handled by setting timeouts for the socket for blocking read and write operations.

The DBIT server 108 has a configurable inactivity timeout, where if a particular client or clients (e.g., application servers 102) connection has no request activity for a configured amount of time the connection may be cleaned up and closed, thus freeing up resources on the DBIT server 108 that were not being used.

When a DBIT connection is closed on the client side (e.g., application server 102) the DBIT driver 106 will internally send a close notification to the DBIT server 108, so that the DBIT server 108 can immediate release the resources associated with this connection. This notification may not block the client thread when closing the connection, as no waiting is done for the result and the socket level write buffering may prevent a blocking write from occurring due to the small message size. If the client connection is closed without sending a notification to the server, the connection resources on the DBIT server 108 will be cleaned up by a nanny thread (not shown) in the completion port manager 214 that periodically checks for sockets that were improperly abandoned by the client and performs the necessary cleanup.

In one embodiment, communication errors may be handled in addition to the timeout handling described above. In some cases, it is possible to encounter communications errors due to network connectivity issues. When this occurs the connection resources are closed and cleaned up accordingly.

In one embodiment, each client (e.g., application server 102) connection may be given a DBIT session that requires basic authentication or some other form of authentication when a connection is established. This authentication information may be different than the authentication information used to access the databases, thus removing the direct database access information and passwords from the application servers 102 back to the DBIT level away from undesired access. The authentication information internally used by the DBIT server 108 may be configured through a local DBIT server configuration file or in a centralized repository, like database 110 or other database remote from DBIT server 108. A DBIT session may exist as long as the client connection associated with it exists.

In one embodiment, DBIT PreparedStatementData, containing the SQL, statement id, and ResultSet metadata for a particular DBIT PreparedStatement sent by the DBIT driver 106 may be cached on the DBIT server 108 with the ability to look it up by either its SQL (first time client request) or its DBIT statement id (subsequent client requests). Since the same statement id is consistently used within a DBIT server instance as the key for a particular statement on all the connections to the actual database (e.g., database 110), different client requests for the same statement can be routed to any available database connection for execution using a cached database PreparedStatement that is looked up using the id as a key. If an application server 102 becomes disconnected from the DBIT server 108, upon reconnect it resends the statement's SQL during its first interaction to obtain an id from the DBIT server 108 that it reconnects to, so that it has an appropriate id for that DBIT server instance session. DBIT driver PreparedStatements are cached on the application server 102 so that SQL, statement id, ResultSet metadata, and other information necessary for efficiently serializing/binding/getting data to/from PreparedStatements/ResultSets on the DBIT server 108 are only transmitted once to the application server 102 for each connection and each DBIT PreparedStatement. The DBIT PreparedStatementData cache on the DBIT server 108 may use an LRU eviction policy when it becomes full. If a statement id from an application server 102 cached DBIT PreparedStatement object is not found in the DBIT PreparedStatementData cache for a request (e.g., it was evicted) to the DBIT server 108, then the client may receive a response to resend its PreparedStatementData (e.g., the SQL), and may then be returned a new ID to submit future requests with. PreparedStatementData can be removed from the DBIT server 108 PreparedStatementData cache when all sessions that make reference to it have been closed and/or have all sessions have reported that the PreparedStatement on the client has been evicted/closed.

In one embodiment, an optimized form of a DBIT PreparedStatement and DBIT ResultSet may be a direct streaming implementation, where data is directly streamed between the application server 102 and the DBIT server 108. Therefore, the data bound to a DBIT PreparedStatement on the application server 102 may be directly written to the connection's stream output buffer as it is set onto the PreparedStatement, instead of being saved to an intermediate structure involving objects and primitive object wrappers. Similarly the data retrieved from database ResultSets on the DBIT server 108 may be pulled directly from the database (e.g., database 110) ResultSet using primitive getter methods (getInt( ) getFloat( ) getDouble( ) etc.) where possible and getString( ) for String values and then written directly to the connection's stream output buffer based on their primitive representation without forming any intermediate object structure. This approach may reduce the overhead in memory footprint, garbage, and serialization costs by eliminating the build up of intermediate structures with object representations that are expensive in memory, creation, and serialization cost.

In one embodiment, a directly streamed DBIT ResultSet on the DBIT server 108 has a standardized mapping of Java data types (primitive and object types) to SQL types found in the database metadata for a ResultSet. The DBIT ResultSet streams the values from the result columns in the order they are found in the database ResultSet metadata to the stream output buffer using the defined Java type representation from the Java/SQL mapping to access the data on the ResultSet via primitive getter methods. Along with each row of data it may also stream a bitmasked set of bits indicating if columns were null or not in the database (e.g., database 110).

In one embodiment, on the first execution of a statement, a Pattern (e.g., Java type and position in result set) may be created from interrogating the ResultSet metadata for each column SQL type and mapping these types to their equivalent Java data type defined in the standardized mapping. This Pattern may be sent to the client on the first execution of the statement ahead of the ResultsSet data. The client may then use the Pattern to unmarshal the data sent by the directly streamed DBIT ResultSet on the DBIT server 108. The unmarshalling may create an array of reusable ResultHolder objects that represent the columns in one record in the ResultSet, where a specific type of ResultHolder may be created based on the data type (IntResultHolder, StringResultHolder, etc.) in the Pattern in the order that it is specified in the Pattern. The reusable ResultHolder array may then be cached on the statement for use reading data directly from the stream for each record from the DBIT server 108.

In one embodiment, when the client is setting parameter values onto the PreparedStatement request, this data is directly streamed into the output stream with self-describing type bytes leading the data. This eliminates intermediate structures and objects and allows the client/server the ability to write/read primitives from the stream directly, thus avoiding object serialization and object creation costs. The server may bind the primitives directly onto a database PreparedStatement using the primitive setter methods for efficiency.

With respect to data flow control between the application server 102 and the DBIT server 108, the direct streaming approach described in example embodiments above may allow for the use of fixed size general purpose byte output stream and input stream buffers on the DBIT server 108 and client (e.g., 16 KB byte array buffers in custom DBIT Java input/output stream implementations), which may limit the long lived heap footprint for communication to a well known and controlled size. There is accordingly little concern over variable sized buffers based on fetch size and record size, but rather a fixed size stream buffer that the data may flow through. In one embodiment these buffers on the client as well as on the DBIT server may be pooled and reused for multiple requests and used by different threads for different statements and connections. These buffers may be associated with particular threads on the client as well as on the DBIT server 108 and can be reused for multiple requests on different connections and statements for a thread. In various embodiments, this pooling and reuse of these general purpose byte buffers across PreparedStatements may eliminate large amounts of memory that is wasted on the client by traditional implementations that specialize, sized by the set fetch size, and associate individual buffers with every PreparedStatement that is created on the client. In various other embodiments, this approach may also have the effect of allowing TCP to naturally control the flow of data between the client and the server as it buffers data and will not let the sender send more data than the client can accept and process at one time, thus protecting both the client and the server, such as DBIT server 108.

The DBIT server 108 may leverage the same connection pooling implementation developed for the DBIT driver 106 discussed above with reference to FIG. 1. Besides providing consistency in the database connection pooling implementation within the multitude of configurations of systems from a maintenance and operational point of view, it may also provide better flexibility for runtime configuration, customized statistics, error handling, control, and statistics reporting in the DBIT tier for connection pooling.

In one embodiment, a connection pool may be created for each unique isolation area, so that the module name can be set in each database connection session to the application poolname, which allows a database administrator the ability to identify queries from different application pools that are funneled through a DBIT pool. Although this approach may create duplicate connection pools to the databases in the DBIT server 108, the number of pools may be limited to the number application server queues that are configured, which may typically be a small finite number for a particular DBIT pool. Further, the reduction in connections to the database (e.g., database 110) due to multiplexing may be far in excess of the few duplicate connections that may exist from this isolation approach.

In one embodiment, large data types like Long (max 2 GB), Long Raw (max 2 GB), CLOB (max 4 GB), and BLOB (max 4 GB) in Oracle may be handled in a manner on the DBIT server 108 to prevent them from consuming large amounts of memory and causing out of memory errors on the DBIT server. This may involve retrieving predefined chunks from the database one at a time and writing them out to the output buffer until the entire request amount of data has been written to the client.

In another embodiment, the DBIT driver 106 supports remote access to the LOB objects (e.g. CLOB and BLOB in Oracle), whereby a conversation protocol for LOB's is implemented that allows the DBIT driver 106 to interact with the LOB remotely on the DBIT server 108 and obtain data.

In one embodiment, DBIT driver 106 batch operations may be handled in the same manner as regular queries, in that they may be streamed directly into the output stream. However, the different addBatch parameter sets may be delineated in the stream with a marker that the server may be able to read and know if more parameter sets are coming or if it has reached the end of the batch.

In one embodiment, separate work queues may be setup for specific queries that are known to have large batches or workload, and the number of threads allowed to execute on this queue may be tuned appropriately to prevent memory contention issues on the DBIT server 108.

In one embodiment, safety checks may be provided to protect DBIT server 108. A set of configurable max sizes may be used to protect the DBIT server 108 from large String or byte arrays or other types of data that could consume a large amount memory and potentially problems with the DBIT server 108. These hard limits may be checked against incoming data to protect the DBIT server 108 from this situation. If a DBIT server 108 does detect situations where hard limits are being hit, it may deny requests and report the occurrence of such cases to the error reporting service.

In one embodiment, the DBIT server 108 may have administrative controls to provide administrative flexibility and control in its operation. These features may include the ability to dynamically change the configuration relating to any part of the system.

FIG. 3 is a diagram illustrating the DBIT server system 100 configured to include load balancers 302 to distribute load demand from application servers 102 across a DBIT server pool 304 for horizontal scalability of the DBIT tier. In various embodiments, the DBIT server pool 304 is made up of similarly configured DBIT servers (e.g., DBIT server 108), so that a request can be satisfied by any DBIT server in the pool. These DBIT servers may be connected to one or more databases, such as DBIT server 108 and database 110 described above.

In one embodiment, a site may be distributed across multiple data centers in different geographic locations, and it may be undesirable to have the DBIT server (e.g., DBIT server 108) used by application servers (e.g., application servers 102) in a different geographical location than the database or the application servers, introducing another geographic location into the path between the application server and the database (e.g., database 110), and thus potentially adding significant latency and reducing site throughput and capacity (e.g., it may be undesirable to have a Denver application server connecting to an Sacramento DBIT server that connects to a Denver database).

In one embodiment, this situation may be addressed by co-locating the DBIT server pool 304 with the application servers 102. The application servers 102 in a specific geographic location may be configured to only use the DBIT server pool 304 in that location. Therefore, the application servers 102 would never connect to another DBIT sever pool in a different geographic location.

In another embodiment, the DBIT servers may be co-located with the databases (e.g., database 110), so that all application servers 102 from all data centers pool point to the same DBIT server pool 304 that is located with the database(s) and thus the DBIT servers (e.g., DBIT server 108) may not introduce another geographic data center location in the path. Additionally, in one embodiment, the DBIT server process could actually reside on the same machine as the database process.

In an example embodiment, in the event of a failure of a DBIT server in the DBIT server pool 304, the failure may be handled through one or more of the load balancers 302. A load balancer may be configured with a health check mechanism. This health check may hit the DBIT server of the DBIT server pool 304, on the same port as application server connections, at a configured interval and the DBIT server may recognize the health check event ID and reply if it is healthy. If the DBIT server is unreachable, does not reply within a configured amount of time, or replies that it is not healthy and/or not currently available, and then the load balancer may automatically remove the DBIT server from the load balancer traffic.

In one embodiment, DBIT servers of DBIT server pool 304 may monitor and provide operational data, such as statistics pages or statistics reporting to a centralized statistics gathering service. The reporting generated by the operations data may be used to assess performance, scalability, availability, and stability.

Figure 4:
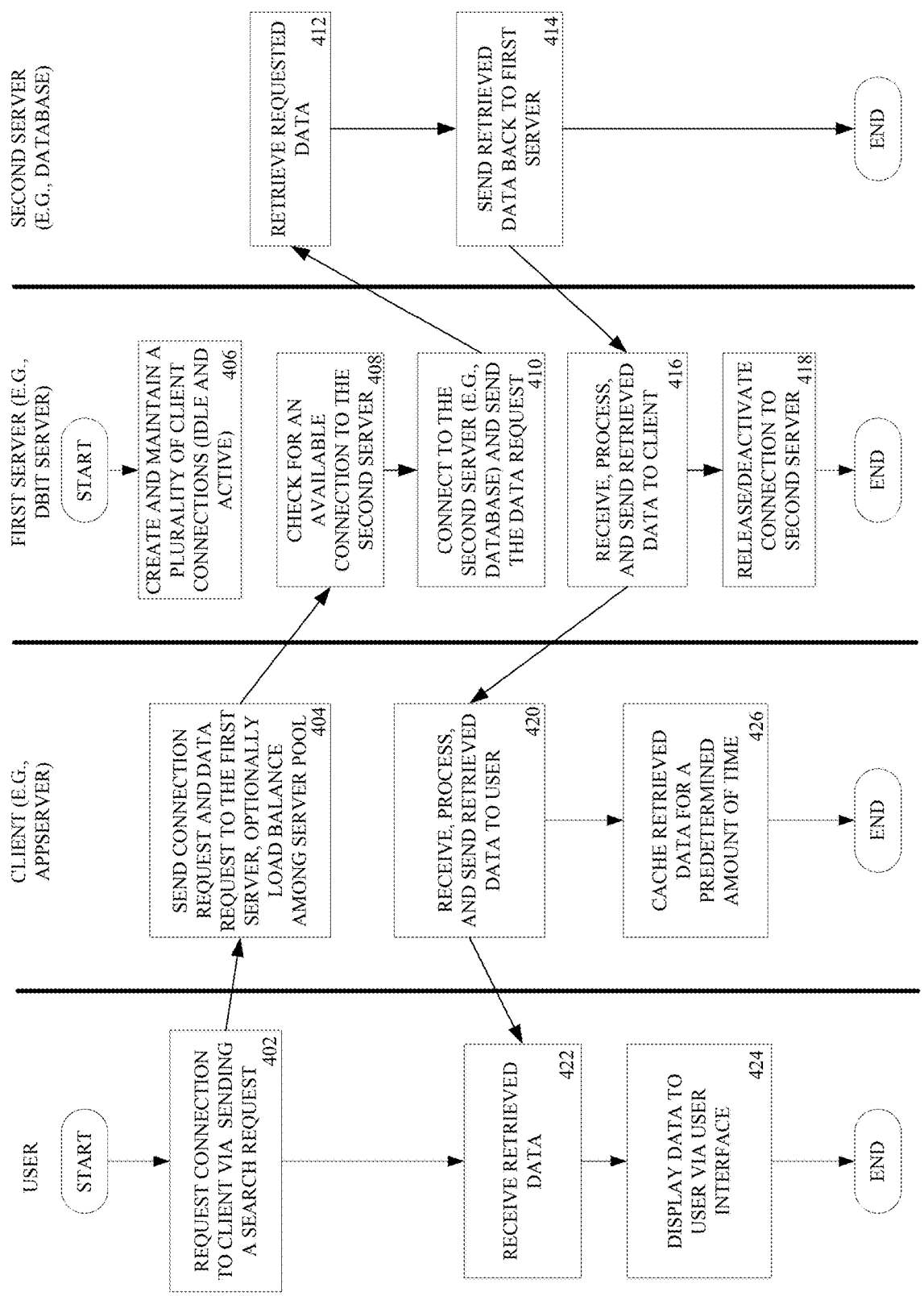
FIG. 4 is a flow chart, according to an example embodiment, illustrating the operations of DBIT server system configured to multiplex connections between the application servers (DBIT clients) and the database (second server) via the DBIT server (first server)

FIG. 4 is a flow chart, according to an example embodiment, illustrating the operations of DBIT server system 100 configured to multiplex connections between the application servers 102 (DBIT clients) and the database 110 (second server) via the DBIT server 108 (first server). At operation 402, a user (e.g., from user devices 101) requests a connection to a DBIT client via a search request. In response, at operation 404, the DBIT client sends a connection request along with a data request to the first server. In various embodiments, the DBIT client or one or more load balancing devices may load balance all DBIT client requests to a server pool (e.g., load balancing device 302 and server pool 304) including the first server. In one embodiment, prior to requesting a connection at operation 402, the first server, at operation 406, creates and maintains a plurality of DBIT client connections whether those connections are idle or active.

At operation 408, the first server checks for an available connection to the second server, and at operation 410, connects to the second server (e.g., database 110) and sends the data request. The second server retrieves requested data at operation 412 and sends back the retrieved data to the first server at operation 414. The first server, at operation 416, receives, processes, and sends retrieved data on to the DBIT client. At operation 418, once the retrieved data is sent, the first server may return the connection to second server to a connection pool to be reused by future requests. The DBIT client then receives, processes, and sends the retrieved data to the user at operation 420. The user, at operation 422 receives the retrieved data and at operation 424, that data is displayed to the user via a user interface device.

In one embodiment, the retrieved data may be cached, at operation 426, for a configured predetermined amount of time depending upon how a particular data set is considered still fresh and has not become stale. Other criteria in conjunction or independent of a freshness time may be used to evict cached result data based on such factors as available RAM or other hardware configuration. Although the data illustrated in this example embodiment is cached in the application servers 102 (DBIT clients), in other embodiments the data may also be cached at the DBIT server 108.

Figure 5:
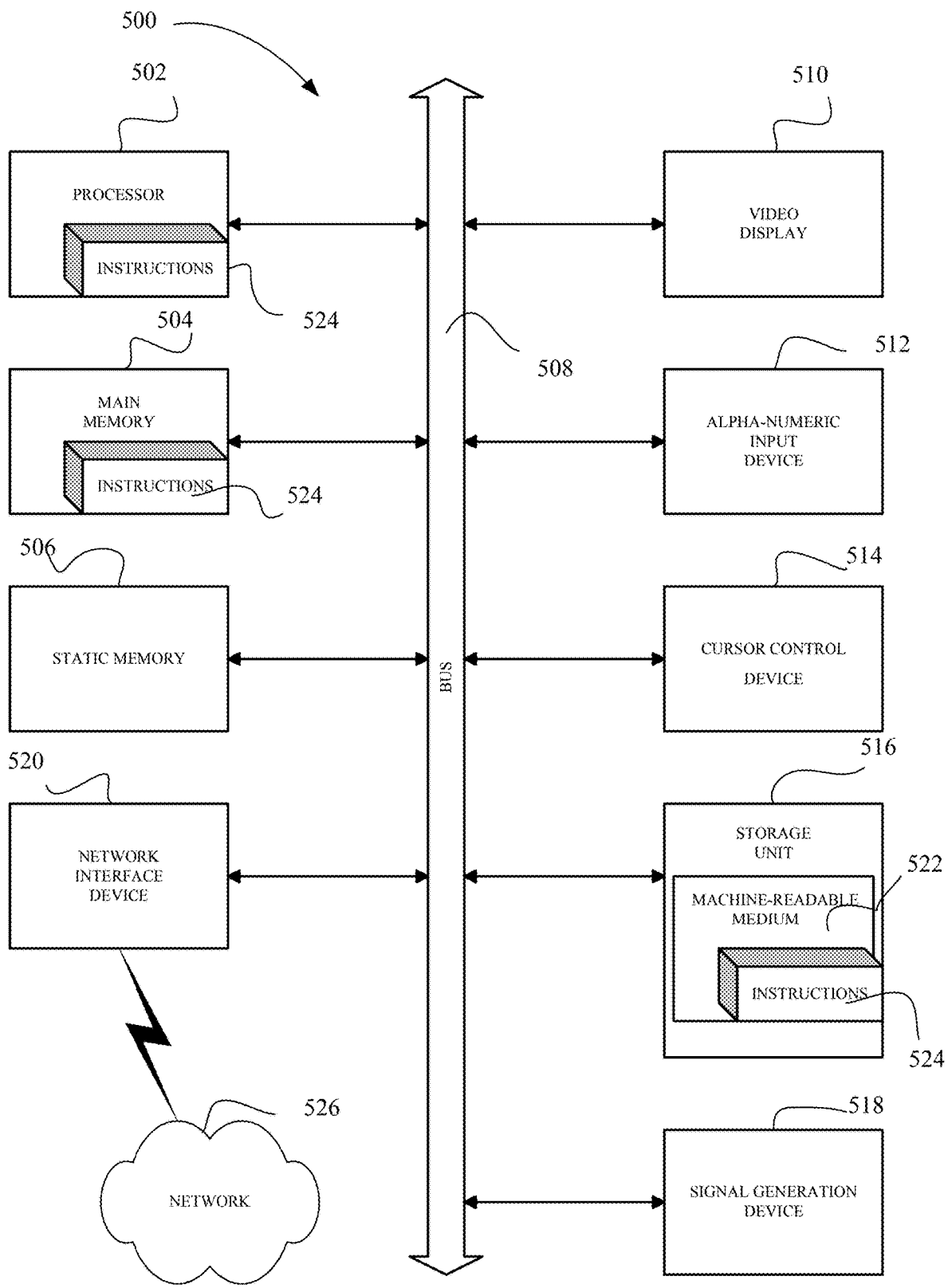
FIG. 5 illustrates a diagrammatic representation of machine in the exemplary form of a computer system within which a set of instructions may be executed to cause the machine to perform any one or more of the methodologies discussed herein.

FIG. 5 illustrates a diagrammatic representation of machine in the exemplary form of a computer system 500 within which a set of instructions may be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a storage unit 516 (e.g., hard-disk drive), a signal generation device 518 (e.g., a speaker) and a network interface device 520.

The storage unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media. The software 524 may further be transmitted or received over a network 526 via the network interface device 520.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

What is claimed is:

1. A method comprising:
   establishing a connection pool based on a pool configuration parameter that limits the connection pool to a database within a geographical location;
   receiving a request to update the pool configuration parameter; and
   reconfiguring, at runtime, the connection pool based on the updated pool configuration parameter.

2. The method of claim 1, wherein the connection pool comprises one or more reusable connections.

3. The method of claim 1, further comprising:
   reconfiguring, at the runtime, the connection pool to be only connected to one or more application servers associated with the geographical location based on the pool configuration parameter.

4. The method of claim 1, further comprising:
   generating a report that includes statistics associated with the connection pool.

5. The method of claim 4, wherein the statistics comprises at least one of a current pool size, a current prepared statement cache size, a prepared statement cache eviction count, a thread wait for connection count, a thread wait for connection timeout count, a running average wait for connection time, a connection orphan count, a created connection count, or a destroyed connection count.

6. The method of claim 1, further comprising:
   providing an API to flush one or more connections from the connection pool.

7. The method of claim 6, further comprising:
   receiving an API request to flush the one or more connections from the connection pool; and
   flushing, at the runtime, the one or more connections from the connection pool.

8. The method of claim 1, further comprising:
   receiving a further API request to flush a query statement from a query statement cache associated with a reusable connection in the connection pool; and
   in response to receiving the further API request, flushing the query statement from the query statement cache.

9. The method of claim 1, further comprising:
   providing a further API to return a connection object with a vendor-specific method.

10. A system comprising:
    one or more hardware processors; and
    a non-transitory machine-readable medium for storing instructions that, when executed by the one or more hardware processors, cause the one or more hardware processors to perform operations comprising:
    establishing a connection pool based on a pool configuration parameter that limits the connection pool to a database within a geographical location;
    receiving a request to update the pool configuration parameter; and
    reconfiguring, at runtime, the connection pool based on the updated pool configuration parameter.

11. The system of claim 10, wherein the connection pool comprises one or more reusable connections.

12. The system of claim 10, wherein the operations further comprise:
    reconfiguring, at the runtime, the connection pool to be only connected to one or more application servers associated with the geographical location based on the pool configuration parameter.

13. The system of claim 10, wherein the operations further comprise:
    generating a report that includes statistics associated with the connection pool.

14. The system of claim 13, wherein the statistics comprises at least one of a current pool size, a current prepared statement cache size, a prepared statement cache eviction count, a thread wait for connection count, a thread wait for connection timeout count, a running average wait for connection time, a connection orphan count, a created connection count, or a destroyed connection count.

15. The system of claim 10, wherein the operations further comprise:
    providing an API to flush one or more connections from the connection pool.

16. The system of claim 15, wherein the operations further comprise:

receiving an API request to flush the one or more connections from the connection pool; and flushing, at the runtime, the one or more connections from the connection pool.

17. The system of claim 10, wherein the operations further comprise:

receiving a further API request to flush a query statement from a query statement cache associated with a reusable connection in the connection pool; and in response to receiving the further API request, flushing the query statement from the query statement cache.

18. A non-transitory machine-readable medium for storing instructions that, when executed by one or more hardware processors, cause the one or more hardware processors to perform operations comprising:

establishing a connection pool based on a pool configuration parameter that limits the connection pool to a database within a geographical location;

receiving a request to update the pool configuration parameter; and reconfiguring, at runtime, the connection pool based on the updated pool configuration parameter.

* * * * *